United States Patent
Boal (10) Patent No.: US 12,403,444 B2
(45) Date of Patent: Sep. 2, 2025

(54) CONTROLLED PRODUCTION OF AQUEOUS HALOGEN SOLUTIONS WITH VARYING COMPOSITIONS

(71) Applicant: De Nora Holdings US, Inc., Concord, OH (US)

(72) Inventor: Andrew K. Boal, Longmont, CO (US)

(73) Assignee: DE NORA HOLDINGS US, INC., Concord, OH (US)

( * ) Notice: Subject to any disclaimer, the term of this patent is extended or adjusted under 35 U.S.C. 154(b) by 686 days.

(21) Appl. No.: 17/774,442

(22) PCT Filed: Nov. 4, 2020

(86) PCT No.: PCT/US2020/058931
§ 371 (c)(1),
(2) Date: May 4, 2022

(87) PCT Pub. No.: WO2021/092048
PCT Pub. Date: May 14, 2021

(65) Prior Publication Data
US 2022/0395797 A1    Dec. 15, 2022

Related U.S. Application Data

(60) Provisional application No. 62/931,303, filed on Nov. 6, 2019.

(51) Int. Cl.
| | | |
|---|---|---|
| B01J 14/00 | (2006.01) | |
| B01J 19/00 | (2006.01) | |
| B01J 19/24 | (2006.01) | |
| C01B 11/20 | (2006.01) | |
| C01B 11/22 | (2006.01) | |

(52) U.S. Cl.
CPC ............. *B01J 14/00* (2013.01); *B01J 19/002* (2013.01); *B01J 19/006* (2013.01); *B01J 19/245* (2013.01); *C01B 11/20* (2013.01); *C01B 11/22* (2013.01); *B01J 2219/00177* (2013.01); *B01J 2219/00763* (2013.01)

(58) Field of Classification Search
CPC ........ B01J 14/00; B01J 19/002; B01J 19/006; B01J 19/245; C01B 11/20; C01B 11/22
See application file for complete search history.

(56) References Cited

U.S. PATENT DOCUMENTS

| | | | |
|---|---|---|---|
| 4,411,799 A | 10/1983 | Ito et al. | |
| 5,516,501 A * | 5/1996 | Kelley | C01B 11/20 |
| | | | 210/754 |
| 5,683,654 A | 11/1997 | Dallmier et al. | |
| 8,183,051 B2 | 5/2012 | Mirkheshty et al. | |
| 2007/0007146 A1 | 1/2007 | Childers, II et al. | |
| 2012/0276222 A1* | 11/2012 | Harvey | A22C 21/00 |
| | | | 424/723 |
| 2015/0191380 A1 | 7/2015 | Glass | |
| 2016/0100581 A1* | 4/2016 | Barak | A01N 59/02 |
| | | | 514/634 |

FOREIGN PATENT DOCUMENTS

| | | | |
|---|---|---|---|
| JP | 6025126 B2 | 5/2014 | |
| KR | 10-2003-0072079 B1 | 9/2003 | |
| WO | 2004026770 A1 | 4/2004 | |
| WO | WO-2014080847 A1 * | 5/2014 | ................ C02F 1/76 |

* cited by examiner

*Primary Examiner* — Yong L Chu
(74) *Attorney, Agent, or Firm* — D'Ambrosio & Menon, PLLC; Usha Menon (57) ABSTRACT

Methods and systems for the controlled production of aqueous halogen solutions with varying compositions are disclosed. According to an embodiment, aqueous solutions of hypochlorite ions are modified through the sequential addition of pH adjusting chemicals, non-chloride halide ions, and halogen stabilizing compounds. Sensors, for measuring physical and chemical properties of the solutions as they change due to the impact of the various chemical reactions, are linked to a control system which, in turn, can control the input of one or more chemicals. The control system facilitates the production of a solution with desired characteristics in terms of pH, specific halogen composition, degree of halogen stabilization, and limiting the production of undesired by products such as bromate ions.

14 Claims, 7 Drawing Sheets

FIG. 7

CONTROLLED PRODUCTION OF AQUEOUS HALOGEN SOLUTIONS WITH VARYING COMPOSITIONS

TECHNICAL FIELD

The present invention is related to producing aqueous halide solutions in a controlled fashion. In particular, the invention is related to the production, in a controlled fashion, of aqueous solutions of varying compositions having at least two aqueous halogen species.

BACKGROUND OF THE INVENTION

Aqueous halogens solutions are used as biocides in many water treatment processes such as disinfection of: drinking water, wastewater, water used in industrial cooling towers, irrigation water, and water used in oil and gas production operations. Aqueous solutions of the hypochlorite ion are most commonly utilized in these applications, although other aqueous halogen species such as stabilized bromine solutions are often used as well. Aqueous solutions having two or more aqueous halogen components are desirable in that they can have many benefits in water treatment processes, including improved, complementary, or synergistic biocidal properties or properties that may be of secondary benefit such as decreased corrosivity and increased halogen stability.

SUMMARY OF THE INVENTION

One or more embodiments of the present invention relate to methods and systems for the controlled production of aqueous halogen solutions having at least two aqueous halogen species. According to an embodiment, a system for controlling the production of an aqueous halogen solution having at least two aqueous halogen species is provided. The system comprises one or more components that are configured to provide: an initial hypochlorite solution, chemicals to control the pH of the initial hypochlorite solution, at least one additional halide ion and, if desired, provide at least one halogen stabilizing compound. The system further comprises a control system having a multitude of sensors capable of monitoring chemical and physical properties of aqueous solutions, a computerized control system, and various pumping mechanisms which are attenuated by said computerized control system. The system further comprises a control system for optimizing the production of the desired solution comprised of at least two aqueous halogen species and the minimization or elimination of the production of undesired chemical species.

According to another embodiment, a method for controlling the production of an aqueous halogen solution having at least two aqueous halogen species is provided. The method involves modifying aqueous solutions of hypochlorite ions through the sequential addition of pH adjusting chemicals, halide ions, and halogen stabilizing compounds. Sensors, for measuring physical and chemical properties of the solutions as they change due to the impact of the various chemical reactions, are linked to a control system which, in turn, can control the input of one or more chemicals. The control system facilitates the production of a solution with desired characteristics in terms of pH, specific halogen composition, degree of halogen stabilization, and limiting the production of undesired byproducts such as bromate ions.

According to an embodiment, a system for producing a mixed aqueous halogen solution having at least two distinct halogen species, includes: (i) a first storage tank containing an aqueous halogen solution devoid of chlorine; (ii) one or more mixing tanks comprising a flow-impeding structure, wherein a first mixing tank is located downstream of the first storage tank; and (iii) piping for transporting a stream of an aqueous hypochlorite solution to the first mixing tank. The flow-impeding structures can include one or more baffles. The aqueous halogen solution is a bromine-containing fluid. Alternately, the aqueous halogen solution includes bromine and iodine. The system can further include a second storage tank for containing the aqueous hypochlorite solution. The piping is configured to transport the aqueous hypochlorite solution from the second storage tank to the first mixing tank. The second storage tank is located upstream of the first mixing tank.

In another embodiment, the system has an in situ apparatus for generating the aqueous hypochlorite solution. The apparatus can include a conventional electrolytic cell. The piping is configured to transport the aqueous hypochlorite solution from the apparatus. The apparatus is located upstream of the first mixing tank.

The system can further include an optional third storage tank containing a pH adjusting chemical.

A static mixer is configured to mix the aqueous hypochlorite solution with the pH adjusting chemical before it is piped to the first mixing tank.

The system can include a first sensor suite. The first sensor suite is fluidically connected to the static mixer. The first sensor suite incorporates one or more sensors for measuring at least a pH of the aqueous hypochlorite solution or the pH of the pH adjusted aqueous hypochlorite solution before it is piped to the first mixing tank.

In the first mixing tank, the baffles are configured to facilitate a thorough mixing of (a) the aqueous hypochlorite solution or the pH adjusted aqueous hypochlorite solution, and (b) the aqueous halogen solution devoid of chlorine to produce the mixed aqueous halogen solution having at least two distinct halogen species.

The system further comprises a second sensor suite located downstream of the first mixing tank. The second sensor suite includes one or more sensors to measure one or more parameters of the mixed aqueous halogen solution. The parameters can be selected from the group consisting of pH, oxidation reduction potential (ORP), UV-Vis absorption profile and combinations thereof.

The system further comprises a fourth storage tank. The fourth storage tank is fluidically connected to the second sensor suite. The fourth storage tank is configured to contain a halogen stabilizing compound.

Piping means transport the mixed aqueous halogen solution and the halogen stabilizing compound to a second mixing tank. The second mixing tank includes one or more baffles. The baffles are configured to facilitate a thorough mixing of (a) the mixed aqueous halogen solution, and (b) the halogen stabilizing compound to produce a stabilized mixed aqueous halogen solution having at least two distinct halogen species.

A fifth storage tank is located downstream of the second mixing tank. The stabilized mixed aqueous halogen solution is routed to the fifth storage tank.

According to another embodiment, a method for producing a mixed aqueous halogen solution having at least two distinct halogen species includes: pumping a stream of an aqueous hypochlorite solution to a first mixing tank; pumping an aqueous halogen solution the first mixing tank, wherein the aqueous halogen solution is devoid of chlorine; and facilitating a thorough mixing in the first mixing tank of the aqueous hypochlorite solution and the aqueous halogen solution devoid of chlorine to produce the mixed aqueous halogen solution having at least two distinct halogen species.

The method further comprises measuring: (i) at least a pH of the aqueous hypochlorite solution before it is transported to the first mixing tank; and (ii) one or more parameters of the mixed aqueous halogen solution, wherein the parameters are selected from the group consisting of pH, oxidation reduction potential (ORP), UV-Vis absorption profile and combinations thereof.

The measurements are processed to control a flow rate of the aqueous hypochlorite solution to the first mixing tank. The measurements can also be used to control a pumping rate of the aqueous hypochlorite solution and/or the aqueous halogen solution to control the reaction between hypochlorite ions and non-chloride halide ions in the first mixing tank.

Objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the following description.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating a preferred embodiment of the invention and are not to be construed as limiting the invention. In the drawings.

DETAILED DESCRIPTION

Embodiments of the present invention, as well as the practice of the present invention, are intended to produce aqueous solutions having at least two or more different aqueous halogen species in any desired ratio between the two or more aqueous halogen species. Within the scope of the present invention, the term "aqueous halogen species" includes dissolved halogens (molecular chlorine, molecular bromine, and molecular iodine), hypohalous acids (hypochlorous acid, hypobromous acid, and hypoiodous acid), hypohalite ions (hypochlorite, hypobromite, and hypoiodite), and haloamine species (any chemical compound having at least one nitrogen atom where the nitrogen atom contains at least one chemical bond to at least one halogen atom).

Oxidation of bromide and iodide ions by hypochlorite ions is well known in the art and proceeds according to the following equations:

As shown, the hypochlorite ion (ClO$^-$) oxidizes either the bromide ion (Br$^-$) to produce a hypobromite ion (BrO$^-$) or the iodide ion (I$^-$) to produce a hypoiodite ion (IO$^-$), with the hypochlorite ion reduced to a chloride ion (Cl$^-$) in both cases.

In practice, the aqueous halogens, especially aqueous bromine and iodine, are stabilized by combining the aqueous halogen with a halogen stabilizing compound. As used herein, the term "halogen stabilizing compound" includes organic or inorganic amine compounds containing at least one nitrogen atom and that include at least one nitrogen to hydrogen bond. When aqueous halogens and halogen stabilizing compounds are combined, the aqueous halogen reacts with the halogen stabilizing compound to convert the nitrogen to hydrogen bond into a nitrogen to halogen bond, effectively producing N-haloamine compounds. Halogen stabilizing compounds can include, without limitation, sulfamic acid, sulfamate salts, hydantoin, 5,5-dimethylhydantoin, taurine, and cyanuric acid.

In the practice of the present invention, the reactions between an initial hypochlorite ion, additional halide ions, and halogen stabilizing compounds have been shown to impact the physical and chemical properties of the solution, such as, changes in solution pH, oxidation-reduction potential (ORP), and the absorption profile of the solution in the ultraviolet and visible (UV-Vis absorption profile) range of wavelengths (herein the range of wavelengths is between 200 and 800 nm). According to one or more embodiments, these changes can be measured (for example, using sensors) to provide a mechanism for controlling both the overall process as well as the solutions produced by the process. This is desirable to both optimally utilize all the chemicals used in the process and to avoid the unwanted production of any undesirable chemical species, such as, bromate ion ($BrO_3^-$).

Figure 1:
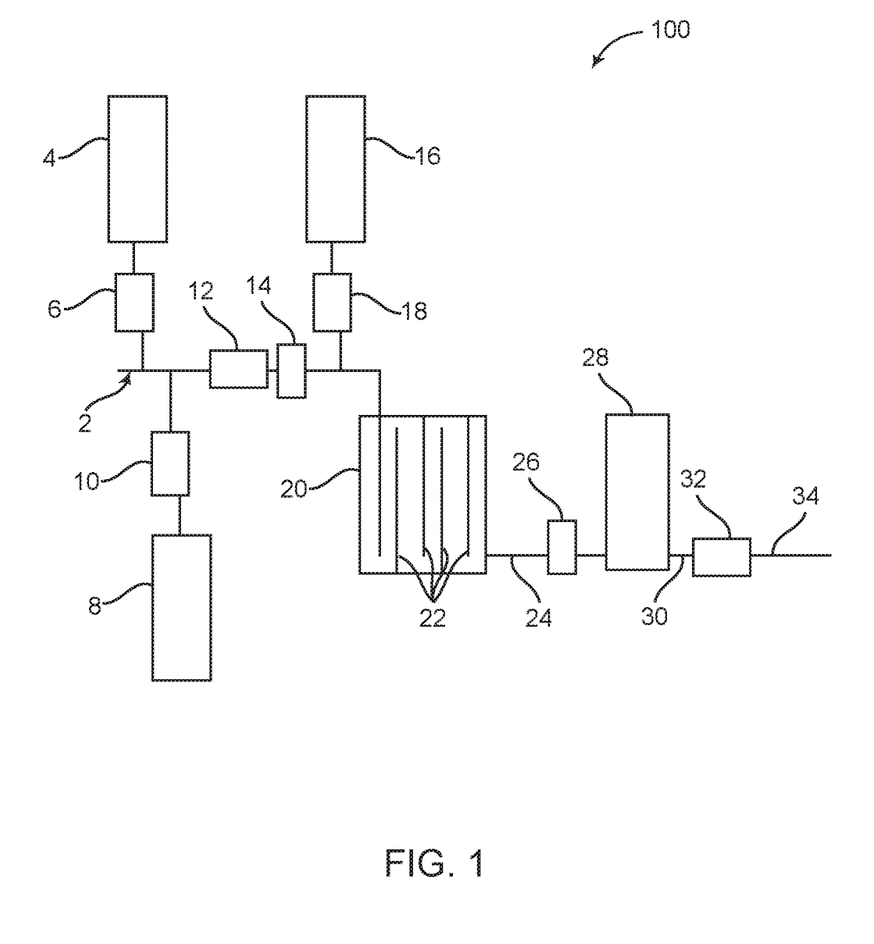
FIG. 1 illustrates an embodiment of a system for the production of mixed aqueous halogen solutions.

FIG. 1 illustrates a schematic of a system 100 for the controlled production of a mixed aqueous halogen solution. Fresh water is piped to the system 100 through pipe 2. As used herein, the term "pipe" means a tube or a line for conveying fluids and solutions. Tank 4 contains an aqueous hypochlorite solution which is injected into the pipe 2 through the action of a pump 6. Preferably, the aqueous hypochlorite solution contained within tank 4 is produced electrochemically and the concentration of hypochlorite ions in the diluted stream is about 3,000 mg/L or less. In one embodiment, the aqueous hypochlorite solution contained within tank 4 can include sodium hypochlorite. However, it is understood that any solution comprised primarily of at least one hypochlorite containing compound can be used herein.

In one embodiment, the pH of the solution can be adjusted at this stage. For instance, tank 8 can contain a solution having at least one pH adjusting chemical dissolved in water which can be combined with the aqueous hypochlorite solution in pipe 2 through the action of pump 10. According to an embodiment, the solution contained within tank 8 can include sodium hydroxide dissolved in water. However, it is understood that any pH adjusting chemical capable of adjusting the pH of the hypochlorite ion containing solution to a desired pH can be used. In one or more embodiments, the pH adjusting chemical can adjust the pH of the hypochlorite solution to between 10-12. In another embodiment, the pH of the hypochlorite solution can be adjusted to between 10.5-11.5.

The resulting diluted hypochlorite solution then passes through a static mixer 12 where it is completely mixed. It is then piped through a first sensor suite 14. According to an embodiment, the sensor suite 14 is configured to at least measure the pH of the diluted hypochlorite solution. However, it is understood that the sensor suite 14 can be configured to measure other solution parameters.

Tank 16 contains an aqueous halide solution having at least one halide ion. The aqueous halide solution is injected into pipe 2 through the action of pump 18. According to an embodiment, the aqueous halide solution contained within tank 16 can be either sodium bromide or sodium iodide dissolved in water. However, it is understood that combinations of these two compounds or any solution containing at least one compound having at least a bromide or iodide ionic component, including, but not limited to quaternary ammonium bromide and quaternary ammonium iodide compounds, could be used.

The combined halogen solution can be piped into mixing tank 20. In the one or more embodiments, the mixing tank 20 can include a flow-impeding structure. In one embodiment, the flow-impeding structure is a series of baffles 22. The baffles 22 can be constructed out of a material, such as, polyvinylchloride or any other suitable material that is compatible with the combined halogen solution produced in the system. The baffles 22 are designed to impede the flow of the combined halogen solution through the tank 20 to provide a desired amount of mixing time. In one or more embodiments, the baffles 22 can include plates or other conventional structures that can impede or slow the flow of the combined halogen solution through the tank such that the solution flowing out of the tank 20 is thoroughly mixed. This mixing time is desirable to allow for the completion of the chemical reaction which will occur between the hypochlorite ions from tank 4 with the at least one halide ion from tank 16. The mixing time may be between 1 minute to 10 minutes.

The fully reacted/mixed solution then passes out of tank 20 along pipe 24 where it passes by a second sensor suite 26 and into tank 28. According to an embodiment, the second sensor suite 26 can be configured to at least measure the pH, ORP, or UV-Vis absorption profile of the diluted mixed halogen solution. However, the second sensor suite 26 can be configured to measure other solution parameters. The mixed halogen solution is transported out of tank 28 along pipe 30 by the action of pump 32 and into pipe 34. Pipe 34 can be configured to deliver the mixed halogen solution to an application point (not shown). As can be appreciated by a person skilled in the art, an application point can vary depending on the specifics of the water treatment process. In one or more embodiments, it can include a cooling tower basin, a swimming pool recirculation line and the like.

The composition of the mixed halogen solution can be adjusted by controlling the chemical reaction occurring between the hypochlorite ions from tank 4, the pH adjusting chemical from tank 8, and the at least one halide ion from tank 16. The first sensor suite 14 and the second sensor suite 26 can be connected to a control system (not shown). The control system that can control one or more features, including: (i) the flow rate of water into pipe 2; and (ii) the pump rates of pumps 6, 10, and 18. Controlling the flow rate effectively controls the relative amount of chemicals that are added in the system 100 so that the correct amount of sodium bromide can be added to produce a solution of the desired composition. The control system can facilitate the production of a solution of mixed aqueous halogens having a specific relative concentration of aqueous halogen species.

Alternatively, in another embodiment, both a non-chloride halide ion and a halogen stabilizing compound can be simultaneously introduced to a stream containing sodium hypochlorite. For example, tank 16 can contain a solution having both at least one non-chloride halide ion as well as at least one halogen stabilizing compound, which are injected into the sodium hypochlorite stream present in pipe 2. Simultaneous addition of the at least one non-chloride halide ion and at least one halogen stabilization compound to the hypochlorite stream can have process benefits such as simplification of the production of the desired mixed halogen solution. For instance, instead of having to independently control two inputs, according to the one or more embodiments, the injection of a combined non-chloride halide solution and halogen stabilizer requires the control of only one injection. Also, this can simplify logistics during the practice of the invention by having one consumable in place of two which and can also decrease costs.

Figure 2:
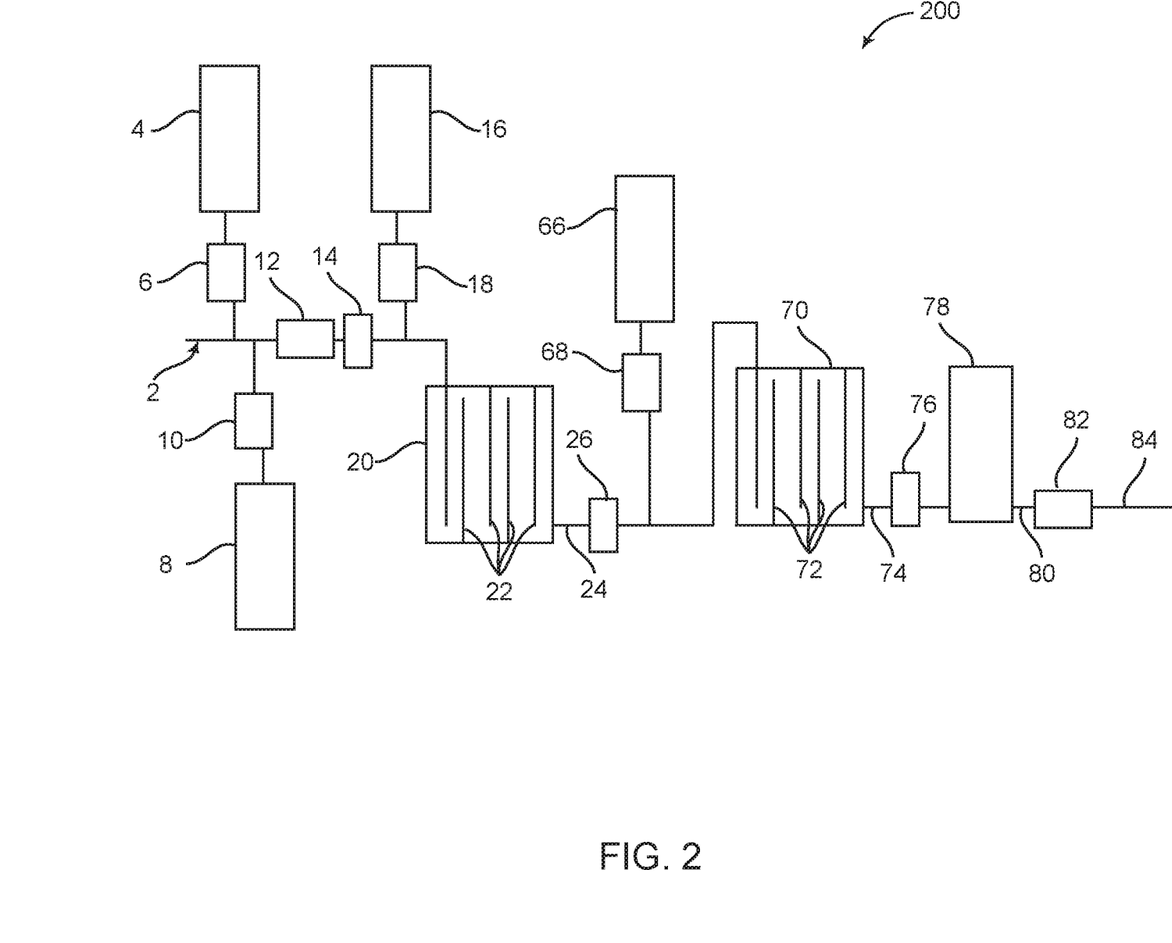
FIG. 2 illustrates an embodiment of a system for the production of stabilized mixed aqueous halogen solutions.
Figure 3:
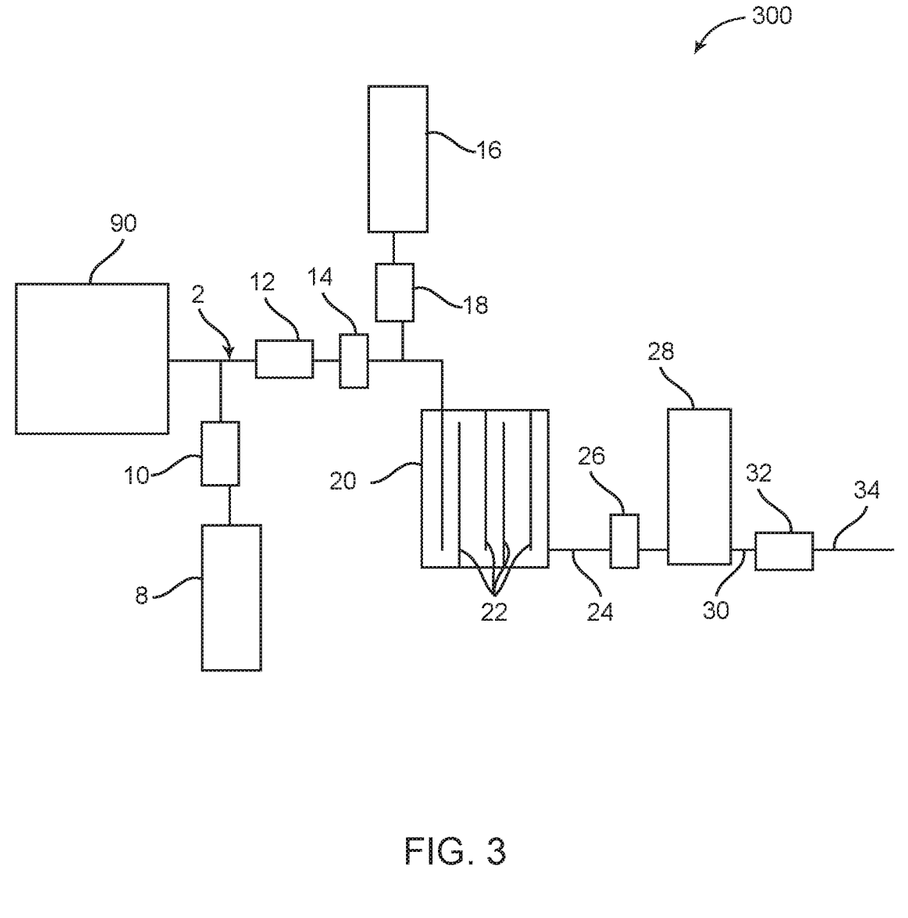
FIG. 3 illustrates an embodiment of a system for the production of mixed aqueous halogen solutions using sodium hypochlorite produced through an electrolysis system as the source of the initial halogen.
Figure 4:
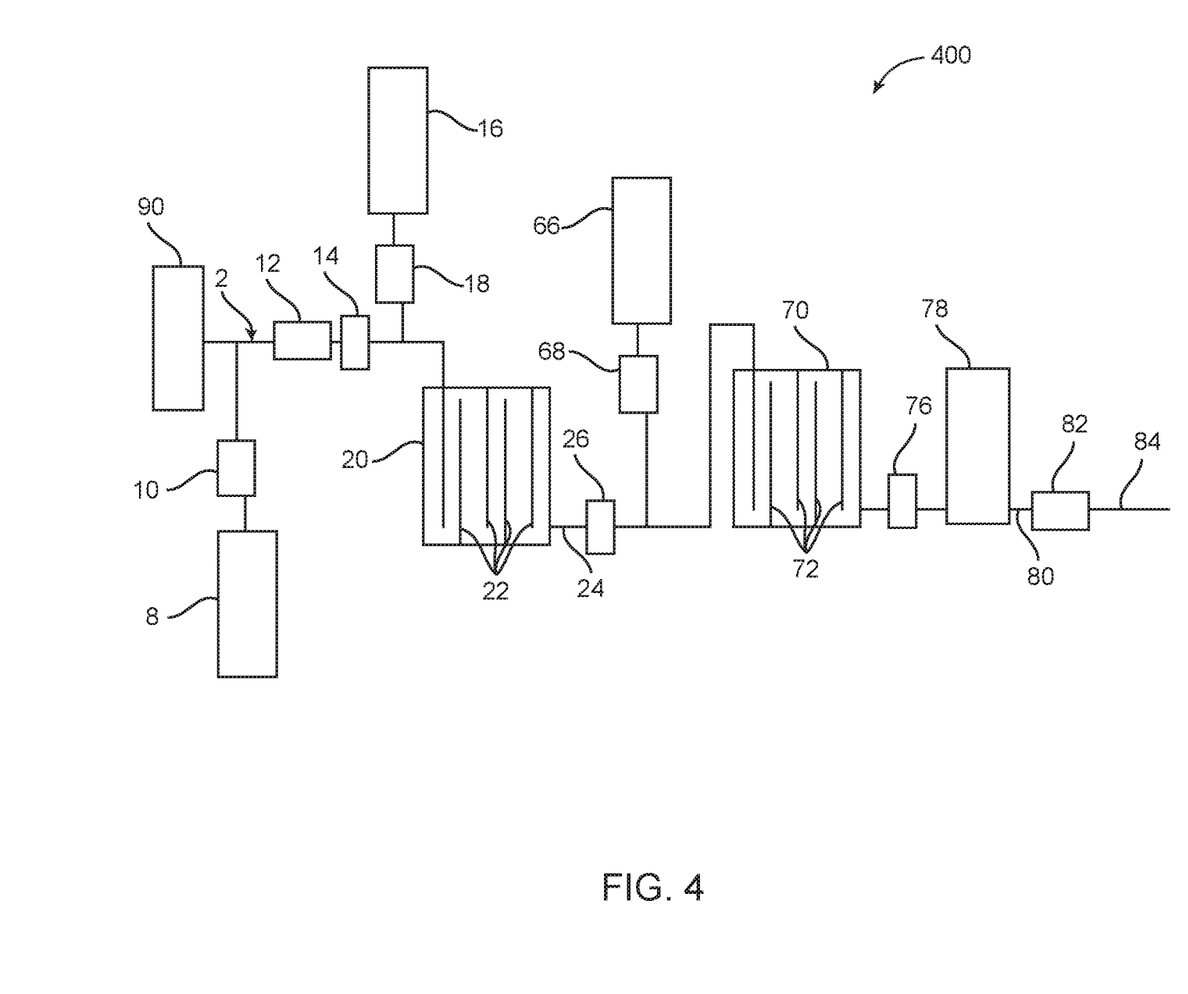
FIG. 4 illustrates an embodiment of a system for the production of stabilized mixed aqueous halogen solutions using sodium hypochlorite produced through an electrolysis system as the source of the initial halogen.

Many of the details discussed above with respect to FIG. 1 apply to other embodiments illustrated in FIGS. 2-4. For instance, in FIGS. 2-4, like numbers are used to refer to like elements and perform the same function. Thus, in the interest of brevity, the following description will focus on differences between the present embodiment discussed in FIG. 1 and embodiments of the present inventive concept discussed below with respect to FIGS. 2-4.

FIG. 2 illustrates an alternative embodiment of a system 200 configured to produce a stabilized mixture of aqueous halogens. As described in FIG. 1, a fully mixed combined halogen solution is piped through pipe 24 and passes through the second sensor suite 26. Tank 66 contains an aqueous solution of at least one halogen stabilizing compound which is injected into pipe 24 by the action of pump 68. The aqueous solution of at least one halogen stabilizing compound can include sodium sulfamate dissolved in water. However, any other halogen stabilizing compound including, but not limited to, sulfamic acid, potassium sulfamate, taurine, glycine, hydantoin, 5,5-dimethylhydantoin, cyanuric acid, or any combination thereof, can be used in accordance with one or more embodiments of this invention. The combined solution of the mixed aqueous halogen solution and the halogen stabilizing compound then passes into a second mixing tank 70. The second mixing tank 70 contains a series of baffles 72 (similar to mixing tank 22). The baffles 72 are configured to regulate the flow of the combined solution through the tank 70 to provide a desired amount of mixing time. This mixing time is desirable to allow for the completion of the chemical reaction which will occur between the mixed aqueous halogen solution with the halogen stabilizing compound introduced from tank 66.

The fully reacted/mixed solution then passes out of tank 70 along pipe 74 where the solution passes by a third sensor suite 76. According to an embodiment, the third sensor suite 76 can be configured to at least measure the pH, ORP, or UV-Vis absorption profile of the diluted hypochlorite solution. However, the third sensor suite 76 can also be configured to measure other solution parameters. The stabilized solution then passes into tank 78, where it can exit along pipe 80 by the action of pump 82 to pipe 84 from where it is delivered to an application point (not shown).

Telemetry from the first, second and third sensor suites 14, 26, and 76 can be connected to the control system. The control system can control: (i) the flow of water into pipe 2; and (ii) the pump rates of pumps 6, 10, 18, 68 and 82. Thus, the system 200 is configured to optimally control the chemical reaction occurring between the hypochlorite ions from tank 4, the pH adjusting chemical from tank 8, the at least one halide ion from tank 16, and the at least one halogen stabilizing compound in tank 66. The control system facilitates the production of a stabilized solution of mixed aqueous halogens having a specific relative concentration of aqueous halogen species and degree of stabilization of said aqueous halogen species. Controlling the flow rate effectively controls the relative amount of chemicals that are added in the system 200 so that the correct amount of hypochlorite ions, sodium bromide and sulfamic acid (or other halogen stabilizer) can be added to produce a stabilized solution of the desired composition. That is, the composition of the solution is adjusted automatically and in real-time by varying the amount of hypochlorite, bromide (or non-chloride halide) and sulfamic acid (or other halogen stabilizer) that are combined such that the final product/solution has a desired FAC content and a free available bromine FAB content before it is routed to an application point.

FIG. 3 illustrates another embodiment of a system 300 for producing a mixed halogen solution wherein an electrolytic cell or an electrolysis system can be used to provide the hypochlorite ions. As shown, the system 300 includes an on-site/in situ electrolysis system/hypochlorite generation system 90 for generating a hypochlorite ion stream. Unlike the embodiment described in FIG. 1, the embodiment 300 described in FIG. 3, can be used to directly produce a solution of stabilized hypochlorite using the electrolysis system 90. The system 300 involves the electrolysis of a brine solution having at least one chloride containing salt, preferably sodium chloride, and at least one halogen stabilizing compound, preferably sulfamic acid. When this brine is electrolyzed, a stabilized halogen solution is produced, which can then be further reacted with bromide or iodide ions introduced to the solution downstream of the electrolysis system 90.

According to an embodiment, the hypochlorite ion concentration is about or less than 3,000 mg/L. The remaining elements and process are as described in FIG. 1 and, as such, not repeated herein for brevity.

Alternatively, this embodiment can be used to simultaneously introduce both a non-chloride halide ion and a halogen stabilizing compound to a stream comprised of sodium hypochlorite. For example, tank 16 can contain a solution containing both at least one non-chloride halide ion as well as at least one halogen stabilizing compound, which would then be injected into the sodium hypochlorite solution produced by electrolysis system 90. Simultaneous addition of both at least one non-chloride halide ion and at least one halogen stabilization compound to the hypochlorite stream could have process benefits such as simplification of the production of the desired mixed halogen solution.

FIG. 4 illustrates an embodiment of a system 400 for producing a stabilized mixed halogen solution wherein an onsite electrolysis system can be used to provide the hypochlorite ions. In this embodiment, an in situ hypochlorite generation system 90 produces an aqueous hypochlorite ion stream, preferably with a hypochlorite ion concentration of about or less than 3,000 mg/L. As shown in system 400, the on-site hypochlorite generation system 90 includes any conventional electrochemical cell configured to produce an oxidant solution containing at least one hypochlorite species through the electrolysis of an aqueous brine having at least one halide containing salt. The halide containing salt used in this process is sodium chloride, although any salt containing at least one chloride ion component could be used. The remaining process and elements are as described in FIG. 2 and, as such, not repeated herein for brevity.

In the one or more embodiments of the present invention, the mixing tanks with internal baffles are intended to both provide a complete mixing of the aqueous halogen solutions as well as provide a sufficient time for any desired chemical reaction to occur. It will be obvious to anyone familiar with the art that other equivalent physical structures, such as mixing loops or in-line mixers, can be used for the same purpose as the baffles described herein.

In the one or more embodiments of the present invention, the sensor suites provide telemetry for controlling all aspects of the process to ensure that a desired outcome is achieved. For instance, this desired outcome can be the production of an aqueous solution having at least two halogen species with or without chemical stabilization of these halogen species. In the one or more embodiments, telemetry from the sensor suites described herein is automatically transmitted to a control system. The control system monitors and analyzes one or more characteristics of the solution to adjust its composition of the solution, such as, the ratio of bromine to chlorine and/or the ratio of stabilized halogen to free halogen. The characteristics can include, without limitation, the pH of the aqueous solution, temperature, oxidant concentration, oxidation/reduction potential (ORP), and ultraviolet absorbance profile. The control system can be configured to automatically, and in real-time, adjust the composition of the solution by adjusting functional aspects such as: (i) the flow rates; and/or (ii) the injection rates of the various chemicals used in the process, such as, varying the amount of hypochlorite ions, bromide (or other non-chloride halide) ions and sulfamic acid (or other halogen stabilizers) that are combined. Controlling these aspects can ensure that the final product/solution has a desired free available chlorine (FAC) content and a free available bromine (FAB) content before it is routed to an application point. Thus, the telemetry provided by the sensor suites can be used to provide, either directly or indirectly, information regarding the composition of the solution with regards to the species of halogens present as well as the degree of stabilization.

Figure 7:
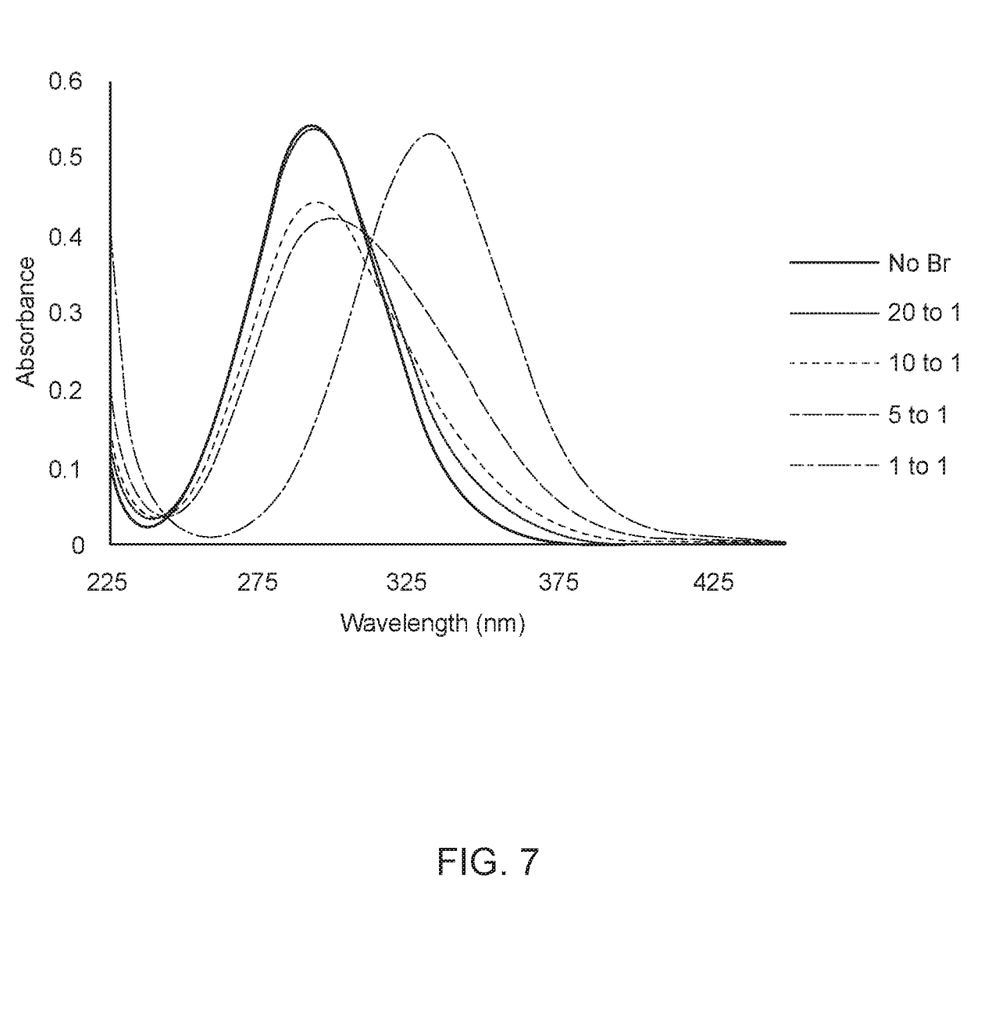
FIG. 7 is a graph showing the ultraviolet-visible absorption spectra of aqueous halogen solutions prepared as described in Example 2.

For example, a sensor can be used to measure the UV-Vis absorption profile of the aqueous halogen solutions produced in the one or more embodiments. Since the various aqueous halogen species have different UV-Vis absorption profiles, telemetry from this sensor can be used to determine the relative concentrations of aqueous halogens and stabilized aqueous halogens present in the solution. For instance, as shown in FIG. 7, the relative intensities of the two peaks can be used to determine the amounts of both bromine and chlorine in the product solution. The sensor measures the absorption profile of the product solution and transmits it to the control system. The control system can include a processor and memory. The processor is configured to process software loaded in the memory to correlate the absorption profile with predetermined data on the composition of a desired product solution. In one or more embodiments, the measured pH or ORP can be correlated with predetermined data on the composition of a desired product solution. This data can then be used by the control system to either inject either more or less bromide, for example, depending on how much bromine is desirable in the final product solution.

Aqueous halogen and stabilized aqueous halogen species that could be measured using the one or more embodiments include dissolved molecular chlorine, dissolved molecular bromine, dissolved molecular iodine, hypochlorous acid, hypobromous acid, hypoiodous acid, hypochlorite ions, hypobromite ions, hypoiodite ions, N-chlorosulfamate, N-bromosulfamate, N-iodosulfamate, N-chlorosulfamic acid, N-bromosulfamic acid, N-iodosulfamic acid, N-chlorotaurine, N-bromotaurine, N-iodotaurine, N,N-dichlorotaurine, N,N-dibromotaurine, N,N-diiodotaurine, N-bromo-N-chlorotaurine, N-bromo-N-iodotaurine, N-chloro-N-iodotaurine, 1-chloro-5,5-dimethylhydantoin, 1-bromo-5,5-dimethylhydantoin, 1-iodo-5,5-dimethylhydantoin, 1,3-dichloro-5,5-dimethylhydantoin, 1,3-dibromo-5,5-dimethylhydantoin, 1,3-diiodo-5,5-dimethylhydantoin, 1-chloro-3-bromo-5,5-dimethylhydantoin, 1-chloro-3-iodo-5,5-dimethylhydantoin, 1-bromo-3-chloro-5,5-dimethylhydantoin, 1-bromo-3-iodo-5,5-dimethylhydantoin, 1-iodo-3-chloro-5,5-dimethylhydantoin, 1-iodo-3-bromo-5,5-dimethylhydantoin, or combinations thereof.

Figure 5:
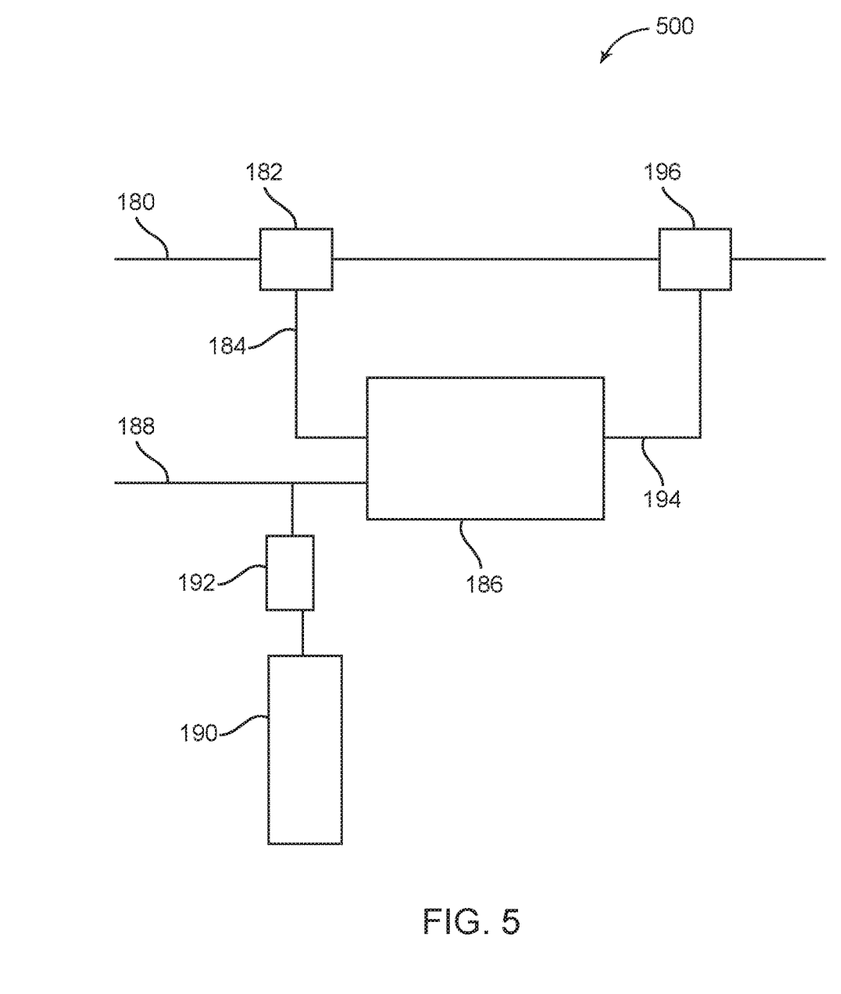
FIG. 5 illustrates an embodiment of a UV sensor system.

Another embodiment of the invention is shown in FIG. 5. The embodiment discloses a process for diluting the final product stream in order to enable the use of UV-Vis spectroscopy to characterize the composition of the mixed halogen solution. As shown, pipe 180 carries the full/main flow of the solution to be analyzed. Valve 182 is configured to divert a small side stream with a flow that is preferably less than or equal to 1% of the total flow in pipe 180. In one or more embodiments, about 0.1% to about 1% of the total flow. This side stream of the main flow is carried along pipe 184 into analyzer 186 for analysis. Dilution water is carried along pipe 188 where it is combined with a pH adjusting chemical, such as, sodium hydroxide, contained in tank 190. The pH of the solution has an impact on the absorption spectra of aqueous halogens. Accordingly, the pH of the solution is controlled to ensure that the pH of the diluted solution does not decrease to a point to where it would interfere with the measurement of the spectral profiles of the solution to be analyzed. In one or more embodiments, the pH can be over 10 and preferably above 11. The diluted solution is injected into pipe 188 by the action of pump 192 prior to entering the analyzer 186. The pH adjusting chemical is added to ensure that the pH of the dilution water matches the pH of the solution to be analyzed. Inside analyzer 186, the flows from pipe 184 and 188 are combined such that the total oxidant(s) contained within the diluted solution has a concentration of between 50 and 250 mg/L. The combined flow is then passed through an ultraviolet sensor configured to measure the absorbance of the solution in the range of 200 to 800 nm. The combined flow then exits analyzer 186 along pipe 194 and into valve 196, where the solution is combined with the total original flow from line 180.

The control system, utilized in the one or more embodiments, is configured to further prevent the formation of undesirable byproducts of the various chemical reactions. For example, it is known that the reaction between hypochlorite ions and bromide ions can result in the production of bromate ions ($BrO_3^-$) under some reaction conditions, specifically when this reaction is carried out at a pH of less than about 10. Therefore, one function of the sensor suites used in the present embodiment is to ensure that the pH of the hypochlorite ion solution is adjusted to greater than 10 prior to the introduction of additional halide ions.

Figure 6:
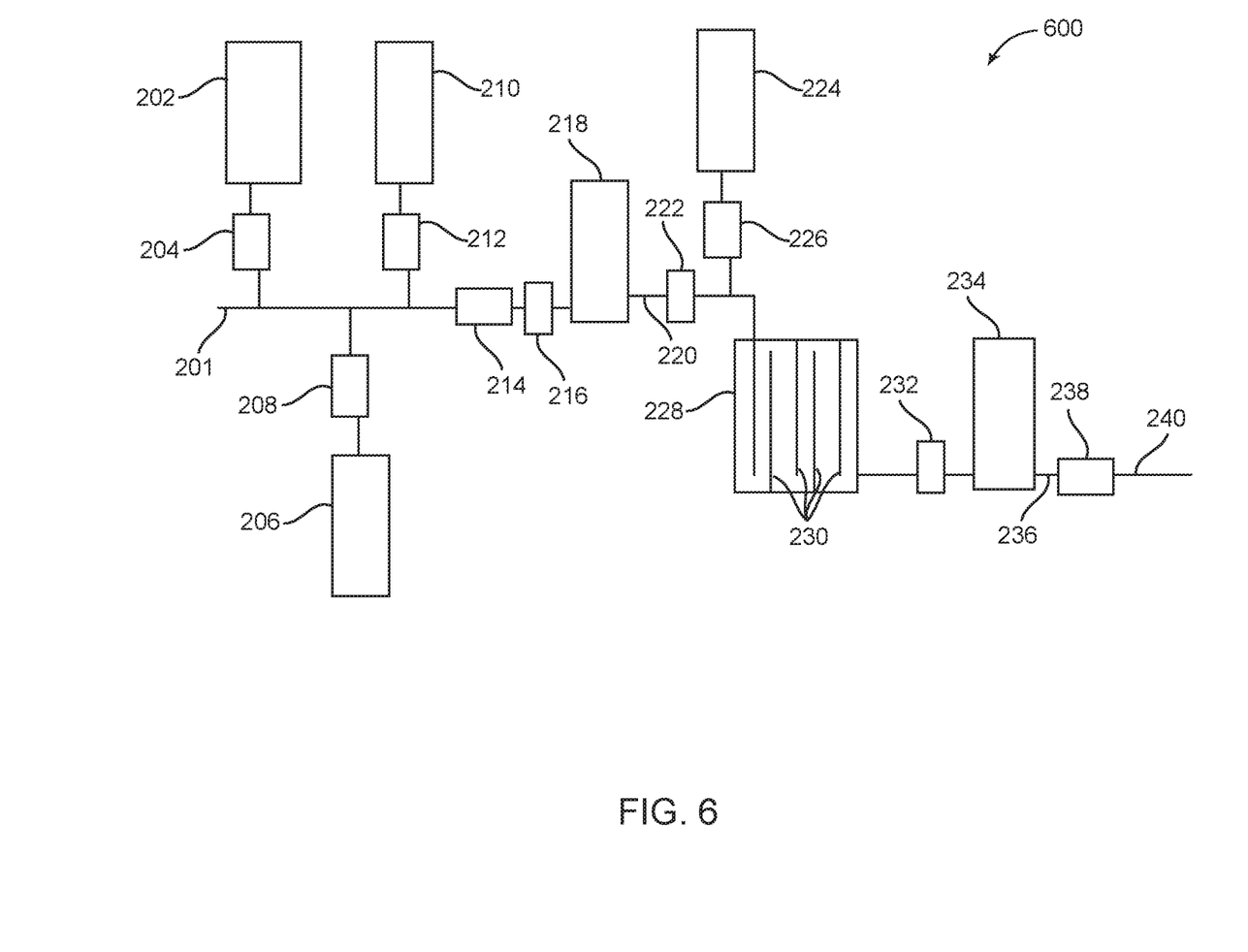
FIG. 6 illustrates an embodiment of a system for the production of stabilized mixed aqueous halogen solutions using an electrolytic process to electrolyze a pH-adjusted mixed halide brine to produce a mixture of aqueous free halogens which are then reacted with a halogen stabilizing compound.

FIG. 6 illustrates an embodiment of a system 600 having an electrolytic process to produce a solution having mixed free halogens which are then stabilized through the addition of a halogen stabilizing compound. In this embodiment, pipe 201 is used to deliver water to the system 600 through a pump means (not shown). Tank 202 contains a solution having at least one halide ion containing salt dissolved in water. According to an embodiment, the at least one halide ion containing salt dissolved in water is sodium chloride. However, it is understood that any salt containing a halide ion can potentially be used in this or other embodiments. Pump 204 is used to transfer the solution contained within tank 202 to pipe 201.

Tank 206 contains a solution comprised of a second one halide ion containing salt, where the halide ion is dissimilar to the halide ion in the salt dissolved in water in tank 202. According to an embodiment, the second halide ion containing salt dissolved in water in tank 206 is sodium bromide although any salt containing a halide ion that is dissimilar to the halide ion in the salt dissolved in water in tank 202 can potentially be used according to this embodiment. Pump 208 is used to transfer the solution contained within tank 206 to pipe 200.

In one embodiment, the pH of the solution can be adjusted at this stage. For instance, tank 210 contains a solution having at least one pH adjusting chemical dissolved in water. According to an embodiment, the pH adjusting chemical dissolved in water in tank 210 is sodium hydroxide. However, it is understood that any chemical capable of adjusting the pH of an aqueous solution can be used in accordance with this embodiment. Pump 212 is used to transfer the solution contained within tank 210 to pipe 201 The combined solution then passes through in-line static mixer 214, past a sensor suite 216, and into an electrolysis system 218.

According to an embodiment, the sensor suite 216 is configured to at least measure the pH of the diluted hypochlorite solution. However, the sensor suite 216 can be configured to measure other solution parameters. The sensor suite 216 can ensure that the mixed halide brine contained within pipe 200 is at the desired pH, and telemetry from sensor suite 216 is sent to a control system (not shown) which is configured to vary the amount of pH adjustment chemical injected into line 200 from tank 210 using pump 212.

The electrolysis system 218 includes an electrolytic cell (not shown) which can electrolyze the mixed halide ion brine to produce a solution having mixed aqueous halogens. This solution passes out of electrolysis system 218 along pipe 220 and past a second sensor suite 220. According to an embodiment, the sensor suite 220 is configured to at least measure the pH, ORP, or UV-Vis absorption profile of the diluted hypochlorite solution. However, the sensor suite 220 can be configured to measure other solution parameters.

Tank 224 contains a solution having at least one halogen stabilizing compound dissolved in water. According to an embodiment, the at least one halogen stabilizing compound dissolved in water in tank 202 is sulfamic acid, although any halogen stabilizing compound, or mixture thereof, can be used. Pump 226 can be used to transfer the solution contained within tank 224 to pipe 220. The combined solution then passes into mixing tank 228 which contains a series of baffles 230. The baffles 230 are configured to regulate the flow of the solution through the tank to provide a desired amount of mixing time. This mixing time is desirable to allow for the completion of the chemical reaction which will occur between the mixed aqueous halogen solution with the halogen stabilizing compound introduced from tank 224.

The fully reacted solution then passes out of tank 228 where the solution passes by a third sensor suite 232. According to an embodiment, the sensor suite 232 is configured to at least measure the pH, ORP, or UV-Vis absorption profile of the diluted hypochlorite solution. However, the sensor suite 232 can also be configured to measure other solution parameters.

Telemetry provided by sensor suite 232 preferably is used to measure properties of the solution to ensure that the desired formation of a stabilized halogen solution has been achieved. Telemetry from sensor suite 232 is further used by a control system not specifically shown here to control aspects of the system such as flow rate and injection rate of the halogen stabilizing compound solution contained within tank 224 to ensure that stabilized halogen solution has been achieved. The solution then passes into tank 234, where the solution then exits along line 236 by the action of pump 238 to line 240 where the solution is delivered to the application point.

EXAMPLES

Various examples are provided below. The data in these examples provide a correlation between measured and monitored characteristics of the solution, such as, ORP and pH with the composition of the solution in terms of bromine and chlorine as well as stabilized and unstabilized halogen.

Example 1

A sodium hypochlorite solution was prepared using an on-site hypochlorite generation system through the electrolysis of a sodium chloride brine, giving a solution with a free available chlorine (FAC) concentration of 3450 mg/L, a pH of 8.94, and an oxidation-reduction potential (ORP) of 813 mV. Four 200 mL samples of this solution were prepared and reacted with 0.1, 0.2, 0.4, and 2.0 g of sodium bromide to produce a series of mixed halogen solutions. The pH, ORP, FAC content, and free available bromine (FAB) content for each solution was measured and is reported in the following table.

TABLE 1

| Sodium Bromide used in Reaction (g) | Mixed Halogen Solution pH | Mixed Halogen Solution ORP (mV) | Mixed Halogen Solution FAC Content (mg/L) | Mixed Halogen Solution FAB Content (mg/L) |
|---|---|---|---|---|
| 0.1 | 9.13 | 799 | 3250 | 150 |
| 0.2 | 9.31 | 793 | 3050 | 325 |
| 0.4 | 9.41 | 793 | 2900 | 825 |
| 2.0 | 9.67 | 790 | 1875 | 2175 |

Example 2

A sodium hypochlorite solution was prepared using an on-site generation system through the electrolysis of a sodium chloride brine. After electrolysis, the pH of the solution was adjusted to 11.16 through the addition of sodium hydroxide, giving a solution with a FAC concentration of 3375 mg/L and an ORP of 427 mV. Four 200 mL samples of this solution were prepared and reacted with 0.098, 0.2, 0.398, and 1.98 g of sodium bromide to produce a series of mixed halogen solutions. The pH, ORP, FAC content, and FAB content for each solution was measured and is reported in the following table. The initial sodium hypochlorite solution, as well as the product solutions, were diluted to a FAC concentration of 95-105 mg/L with deionized water and the ultraviolet-visible (UV-Vis) absorption spectra of the resulting solutions were then recorded. Graphs showing the changes in these spectra in the wavelength range of 225 to 450 nm are given in FIG. 7.

TABLE 2

| Sodium Bromide used in Reaction (g) | Mixed Halogen Solution pH | Mixed Halogen Solution ORP (mV) | Mixed Halogen Solution FAC Content (mg/L) | Mixed Halogen Solution FAB Content (mg/L) |
|---|---|---|---|---|
| 0.098 | 11.12 | 558 | 3325 | 125 |
| 0.2 | 11.17 | 596 | 3000 | 200 |
| 0.398 | 11.16 | 625 | 2700 | 525 |
| 1.98 | 11.11 | 647 | 2175 | 1400 |

Example 3

An aqueous chlorine solution with a FAC concentration of 3800 mg/L prepared by electrolysis. The ORP value of this solution was measured to be 795 mV with a pH of 9.04. Three 200 mL samples of this solution were prepared and reacted with 0.3, 1.3, and 2.6 g of sodium sulfamate to produce the sulfamate stabilized halogen solutions. The pH, ORP, FAC content, FAB content, and total chlorine (TC) content for each solution was measured and is reported in the following table.

TABLE 3

| Sodium+++ Sulfamate used in Reaction (g) | Mixed Halogen Solution pH | Mixed Halogen Solution ORP (mV) | Mixed Halogen Solution FAC Content (mg/L) | Mixed Halogen Solution FAB Content (mg/L) | Mixed Halogen Solution TC Content (mg/L) |
|---|---|---|---|---|---|
| 0.3 | 11.37 | 611 | 2400 | 0 | 3825 |
| 1.3 | 11.01 | 529 | 50 | 0 | 3900 |
| 2.6 | 10.94 | 483 | 0 | 0 | 3825 |

Example 4

A mixed aqueous halogen solution comprised of aqueous chlorine and aqueous bromine was prepared by adding 0.76 g sodium bromide to 700 mL of an aqueous chlorine solution with a FAC concentration of 3800 mg/L prepared by electrolysis. The ORP value of this solution was measured to be 796 mV with a pH of 9.26. Three 200 mL samples of this solution were prepared and reacted with 0.3, 1.3, and 2.6 g of sodium sulfamate to produce the sulfamate stabilized halogen solutions. The pH, ORP, FAC content, FAB content, and total chlorine (TC) content for each solution was measured and is reported in the following table.

TABLE 4

| Sodium Sulfamate used in Reaction (g) | Mixed Halogen Solution pH | Mixed Halogen Solution ORP (mV) | Mixed Halogen Solution FAC Content (mg/L) | Mixed Halogen Solution FAB Content (mg/L) | Mixed Halogen Solution TC Content (mg/L) |
|---|---|---|---|---|---|
| 0.3 | 11.31 | 617 | 2475 | 950 | 3825 |
| 1.3 | 11.05 | 544 | 525 | 450 | 3775 |
| 2.6 | 10.98 | 509 | 275 | 425 | 3675 |

Example 5

A mixed aqueous halogen solution comprised of aqueous chlorine and aqueous bromine was prepared by adding 7.6 g sodium bromide to 700 mL of an aqueous chlorine solution with a FAC concentration of 3800 mg/L prepared by electrolysis. The ORP value of this solution was measured to be 786 mV with a pH of 9.68. Three 200 mL samples of this solution were prepared and reacted with 0.3, 1.3, and 2.6 g of sodium sulfamate to produce the sulfamate stabilized halogen solutions. The pH, ORP, FAC content, FAB content, and total chlorine (TC) content for each solution was measured and is reported in the following table.

TABLE 5

| Sodium Sulfamate used in Reaction (g) | Mixed Halogen Solution pH | Mixed Halogen Solution ORP (mV) | Mixed Halogen Solution FAC Content (mg/L) | Mixed Halogen Solution FAB Content (mg/L) | Mixed Halogen Solution TC Content (mg/L) |
|---|---|---|---|---|---|
| 0.3 | 11.19 | 616 | 2450 | 1425 | 3525 |
| 1.3 | 11.09 | 561 | 2650 | 2540 | 3700 |
| 2.6 | 10.98 | 533 | 2725 | 2575 | 3725 |

Example 6

An aqueous chlorine solution with a FAC concentration of 3600 mg/L prepared by electrolysis with the pH adjusted to 10.98, with the resulting solution having an ORP value of 585 mV. Three 200 mL samples of this solution were prepared and reacted with 0.25, 1.3, and 2.5 g of sodium sulfamate to produce the sulfamate stabilized halogen solutions. The pH, ORP, FAC content, FAB content, and total chlorine (TC) content for each solution was measured and is reported in the following table.

TABLE 6

| Sodium Sulfamate used in Reaction (g) | Mixed Halogen Solution pH | Mixed Halogen Solution ORP (mV) | Mixed Halogen Solution FAC Content (mg/L) | Mixed Halogen Solution FAB Content (mg/L) | Mixed Halogen Solution TC Content (mg/L) |
|---|---|---|---|---|---|
| 0.25 | 11.29 | 601 | 2125 | 0 | 3700 |
| 1.3 | 11.09 | 489 | 0 | 0 | 3750 |
| 2.5 | 11.06 | 459 | 0 | 0 | 3725 |

Example 7

A mixed aqueous halogen solution comprised of aqueous chlorine and aqueous bromine was prepared by adding 0.72 g sodium bromide to 700 mL of an aqueous chlorine solution with a FAC concentration of 3600 mg/L prepared by electrolysis. The reaction between hypochlorite and bromide was allowed to proceed to completion, and the pH of the mixed halogen solution was then adjusted to 10.85. This solution had an ORP value of 649 mV. Three 200 mL samples of this solution were prepared and reacted with 0.25, 1.3, and 2.5 g of sodium sulfamate to produce the sulfamate stabilized halogen solutions. The pH, ORP, FAC content, FAB content, and total chlorine (TC) content for each solution was measured and is reported in the following table.

TABLE 7

| Sodium Sulfamate used in Reaction (g) | Mixed Halogen Solution pH | Mixed Halogen Solution ORP (mV) | Mixed Halogen Solution FAC Content (mg/L) | Mixed Halogen Solution FAB Content (mg/L) | Mixed Halogen Solution TC Content (mg/L) |
|---|---|---|---|---|---|
| 0.25 | 11.26 | 606 | 2100 | 475 | 3600 |
| 1.3 | 11.10 | 522 | 600 | 575 | 3750 |
| 2.5 | 11.08 | 486 | 425 | 550 | 3750 |

Example 8

A mixed aqueous halogen solution comprised of aqueous chlorine and aqueous bromine was prepared by adding 7.2 g sodium bromide to 700 mL of an aqueous chlorine solution with a FAC concentration of 3600 mg/L prepared by electrolysis. The reaction between hypochlorite and bromide was allowed to proceed to completion, and the pH of the mixed halogen solution was then adjusted to 10.83. This solution had an ORP value of 657 mV. Three 200 mL samples of this solution were prepared and reacted with 0.25, 1.3, and 2.5 g of sodium sulfamate to produce the sulfamate stabilized halogen solutions. The pH, ORP, FAC content, FAB content, and total chlorine (TC) content for each solution was measured and is reported in the following table.

TABLE 8

| Sodium Sulfamate used in Reaction (g) | Mixed Halogen Solution pH | Mixed Halogen Solution ORP (mV) | Mixed Halogen Solution FAC Content (mg/L) | Mixed Halogen Solution FAB Content (mg/L) | Mixed Halogen Solution TC Content (mg/L) |
|---|---|---|---|---|---|
| 0.25 | 11.19 | 607 | 2525 | 1600 | 3125 |
| 1.3 | 11.11 | 549 | 2575 | 1900 | 3475 |
| 2.5 | 11.05 | 514 | 2675 | 2300 | 3600 |

Example 9

A mixed aqueous halogen solution comprised of sodium hypochlorite and N-chlorosulfamate species was prepared through the electrolysis of saturated sodium chloride brines containing sulfamic acid at a concentration of 50 g/L. The pH of the mixed halogen solution was found to be 11.15 with a TC concentration of 2475 mg/L. Four 200 mL samples of this solution were prepared and reacted with 0.101, 0.205, 0.410, and 2.043 g of sodium bromide to produce a series of mixed halogen solutions. The pH, FAC content, and FAB content for each solution was measured and is reported in the following table.

TABLE 9

| Sodium Bromide used in Reaction (g) | Mixed Halogen Solution pH | Mixed Halogen Solution FAC Content (mg/L) | Mixed Halogen Solution FAB Content (mg/L) | Mixed Halogen Solution TC Content (mg/L) |
|---|---|---|---|---|
| 0.101 | 11.13 | 1400 | 250 | 3500 |
| 0.205 | 11.12 | 1100 | 450 | 3250 |
| 0.410 | 11.09 | 1825 | 800 | 3225 |
| 2.043 | 10.96 | 2450 | 1472 | 3075 |

Example 10

A mixed aqueous halogen solution comprised of sodium hypochlorite and N-chlorosulfamate species was prepared through the electrolysis of saturated sodium chloride brines containing sulfamic acid at a concentration of 100 g/L. The pH of the mixed halogen solution was found to be 11.03 with a TC concentration of 3725 mg/L. Four 200 mL samples of this solution were prepared and reacted with 0.116, 0.235, 0.469, and 2.337 g of sodium bromide to produce a series of mixed halogen solutions. The pH, FAC content, and FAB content for each solution was measured and is reported in the following table.

TABLE 10

| Sodium Bromide used in Reaction (g) | Mixed Halogen Solution pH | Mixed Halogen Solution FAC Content (mg/L) | Mixed Halogen Solution FAB Content (mg/L) | Mixed Halogen Solution TC Content (mg/L) |
|---|---|---|---|---|
| 0.116 | 10.17 | 475 | 250 | 3225 |
| 0.235 | 10.88 | 675 | 525 | 3350 |
| 0.469 | 10.85 | 1200 | 825 | 3350 |
| 2.337 | 1.016 | 2275 | 1925 | 3200 |

Example 11

An aqueous chlorine solution with a FAC concentration of 3625 mg/L prepared by electrolysis. The ORP value of this solution was measured to be 804 mV and a pH of 8.96. Nine 200 mL samples of this solution were prepared and reacted sodium bromide and sodium sulfamate dissolved in 20 mL of water prior to addition to the initial aqueous chlorine solution. The pH, ORP, FAC content, FAB content, and total chlorine (TC) content for each solution was measured and is reported in the following table.

TABLE 11

| Sodium Sulfamate used in Reaction (g) | Sodium Bromide used in Reaction (g) | Mixed Halogen Solution pH | Mixed Halogen Solution ORP (mV) | Mixed Halogen Solution FAC Content (mg/L) | Mixed Halogen Solution FAB Content (mg/L) | Mixed Halogen Solution TC Content (mg/L) |
|---|---|---|---|---|---|---|
| 0.2 | 0.25 | 11.24 | 628 | 1975 | 675 | 3325 |
| 0.2 | 1.3 | 10.94 | 515 | 0 | 0 | 3550 |
| 0.4 | 0.25 | 11.26 | 617 | 1625 | 925 | 3250 |
| 0.4 | 1.3 | 11.06 | 543 | 225 | 150 | 3625 |
| 2.1 | 0.25 | 11.11 | 618 | 2000 | 1575 | 3075 |
| 2.1 | 1.3 | 10.92 | 534 | 525 | 300 | 3475 |

Therefore, the present invention is well adapted to attain the ends and advantages mentioned as well as those that are inherent therein. The previous description is not intended to limit the invention, which may be used according to different aspects or embodiments without departing from the scope thereof. The discussion of acts, steps, chemicals, devices, components, elements and the like are included in this specification solely for the purpose of providing a context for the present invention. It is not suggested or represented that any or all of these matters formed part of the prior art base or were common general knowledge in the field relevant to the present invention.

Furthermore, the particular illustrative embodiments disclosed above may be altered or modified and all such variations are considered within the scope and spirit of the present invention. While systems and methods are described in terms of "comprising," "containing," or "including" various devices/components or steps, it is understood that the systems and methods also can "consist essentially of" or "consist of" the various components and steps. Whenever a numerical range with a lower limit and an upper limit is disclosed, any number and any included range falling within the range is specifically disclosed. In particular, every range of values (of the form, "from about a to about b," or, equivalently, "from approximately a to b") disclosed herein is to be understood to set forth every number and range encompassed within the broader range of values. If there is any conflict in the usages of a word or term in this specification, claims and one or more patent(s) or other documents that may be incorporated herein by reference, the definitions that are consistent with this specification should be adopted.

The invention claimed is:

1. A system for producing a mixed aqueous halogen solution having at least two distinct halogen species, comprising:
    (i) a first storage tank, the first storage tank is configured to contain an aqueous halide solution, and wherein the aqueous halide solution is devoid of chlorine;
    (ii) a first mixing tank located downstream of the first storage tank, wherein the first mixing tank comprises a flow-impeding structure; and
    (iii) piping for transporting a stream of an aqueous hypochlorite solution to the first mixing tank;
    (iv) a second storage tank for storing a pH adjusting chemical;
    (v) a static mixer for mixing the aqueous hypochlorite solution with the pH adjusting chemical before it is piped to the first mixing tank;
    (vi) a first sensor suite, wherein the first sensor suite comprises at least a pH sensor to measure the pH of the pH adjusted aqueous hypochlorite solution before it is transported to the first mixing tank.

2. The system according to claim 1, further comprising a third storage tank containing the aqueous hypochlorite solution, wherein the piping is configured to transport the aqueous hypochlorite solution from the third storage tank to the first mixing tank, and wherein the third storage tank is located upstream of the first mixing tank.

3. The system according to claim 1, further comprising an in situ apparatus for generating the aqueous hypochlorite solution, wherein the piping is configured to transport the aqueous hypochlorite solution from the apparatus, and wherein the apparatus is located upstream of the first mixing tank.

4. The system according to claim 1, wherein the flow-impeding structure comprises one or more baffles, wherein the baffles are configured to facilitate a thorough mixing of (a) the pH adjusted aqueous hypochlorite solution, and (b) the aqueous halide solution devoid of chlorine to produce the mixed aqueous halide solution having at least two distinct halogen species.

5. The system according to claim 4, wherein the aqueous halide solution is a bromine-containing fluid.

6. The system according to claim 1, wherein the aqueous halide solution includes bromine and iodine.

7. The system according to claim 4, further comprising a second sensor suite located downstream of the first mixing tank, wherein the second sensor suite includes one or more sensors to measure one or more parameters of the mixed aqueous halide solution.

8. The system according to claim 7, wherein the parameters are selected from the group consisting of pH, oxidation reduction potential (ORP), UV-Vis absorption profile and combinations thereof.

9. The system according to claim 7, further comprising a fourth storage tank, wherein the fourth storage tank is fluidically connected to the second sensor suite, and wherein the fourth storage tank is configured to contain a halogen stabilizing compound.

10. The system according to claim 9, further comprising piping for transporting the mixed aqueous halide solution and the halogen stabilizing compound to a second mixing tank.

11. The system according to claim 10, wherein the second mixing tank includes one or more baffles and wherein the baffles are configured to facilitate a thorough mixing of (a) the mixed aqueous halide solution, and (b) the halogen stabilizing compound to produce a stabilized mixed aqueous halide solution having at least two distinct halogen species.

12. The system according to claim 11, further comprising a fifth storage tank located downstream of the second mixing tank, wherein the stabilized mixed aqueous halide solution is routed to the fifth storage tank.

13. A system for producing a mixed aqueous halogen solution having at least two distinct halogen species, comprising:
(i) a first storage tank, the first storage tank is configured to contain an aqueous halide solution, and wherein the aqueous halide solution is devoid of chlorine;
(ii) a flow-impeding structure located downstream of the first storage tank; and
(iii) piping for transporting a stream of an aqueous hypochlorite solution to the flow-impeding structure;
(iv) a second storage tank for storing a pH adjusting chemical;
(v) a static mixer for mixing the aqueous hypochlorite solution with the pH adjusting chemical before it is piped to the first mixing tank;
(vi) a first sensor suite, wherein the first sensor suite comprises at least a pH sensor to measure the pH of the pH adjusted aqueous hypochlorite solution before it is transported to the first mixing tank.

14. The system according to claim 13, further comprising a first mixing tank.

* * * * *